July 16, 1957 W. H. TAYLOR 2,799,212
FEEDING, COUNTING AND STACKING MECHANISM
Filed Aug. 12, 1953 5 Sheets-Sheet 2

Inventor:
William H. Taylor.
By Wilson & Geppert
Attorneys.

July 16, 1957  W. H. TAYLOR  2,799,212
FEEDING, COUNTING AND STACKING MECHANISM
Filed Aug. 12, 1953  5 Sheets-Sheet 3
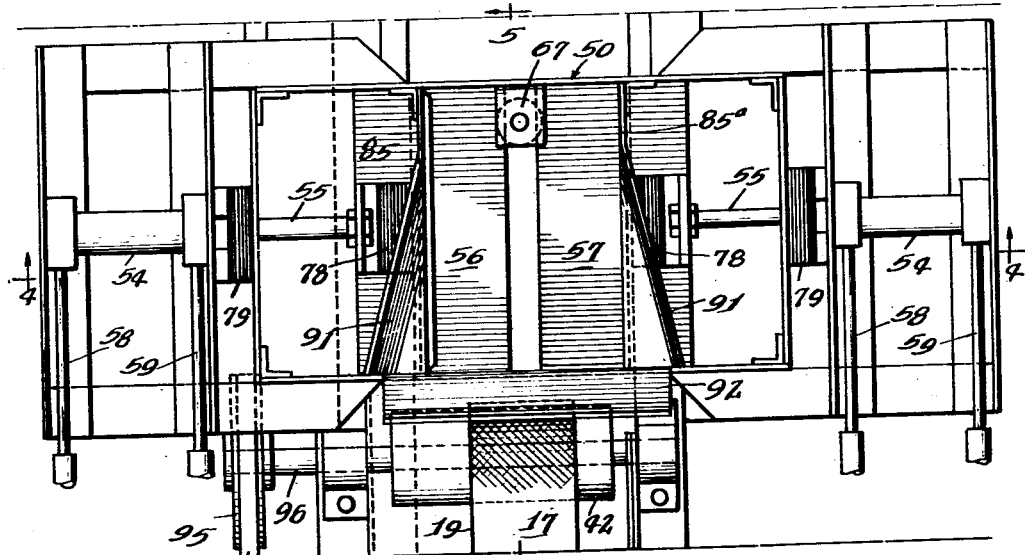
Fig. 3
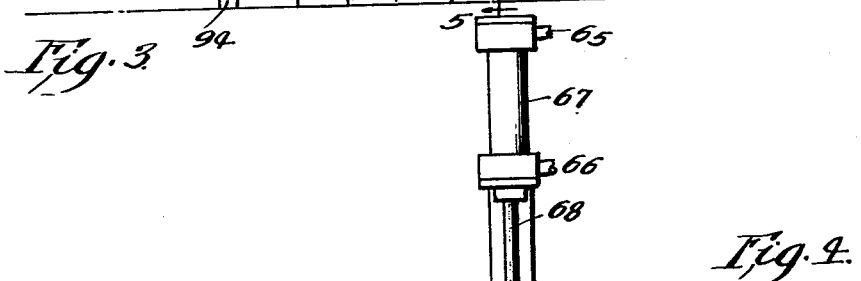
Fig. 4
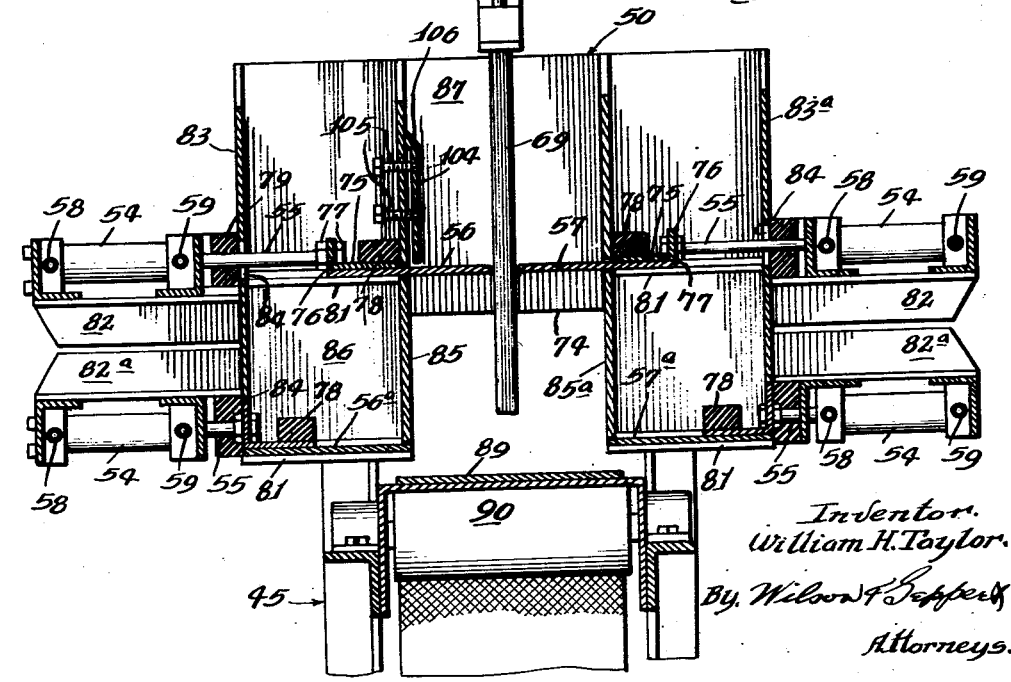
Inventor.
William H. Taylor.
By Wilson & Jeffery
Attorneys.

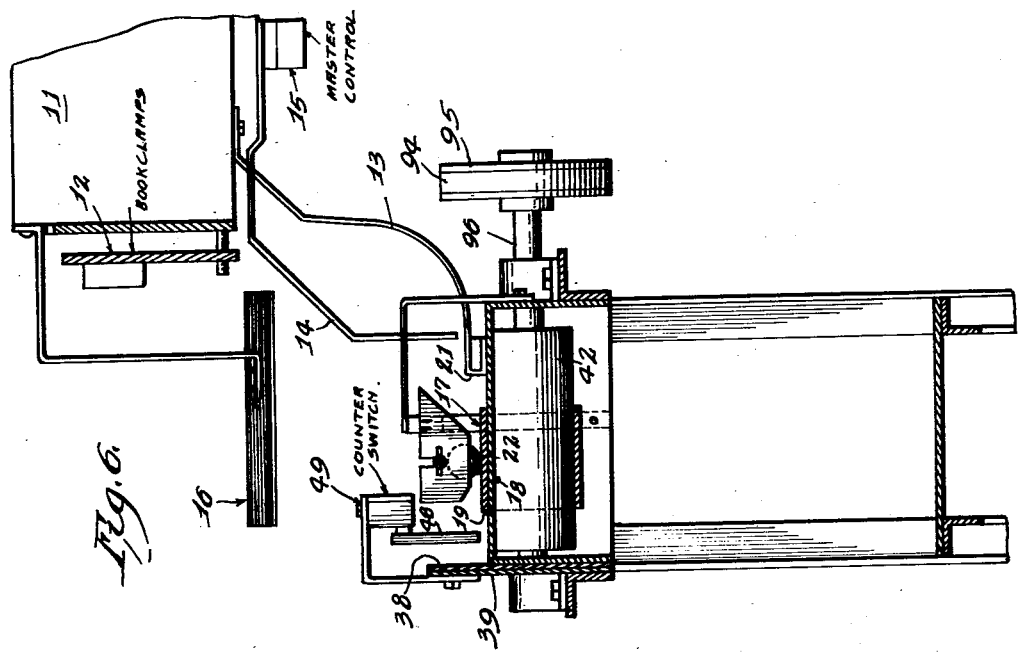

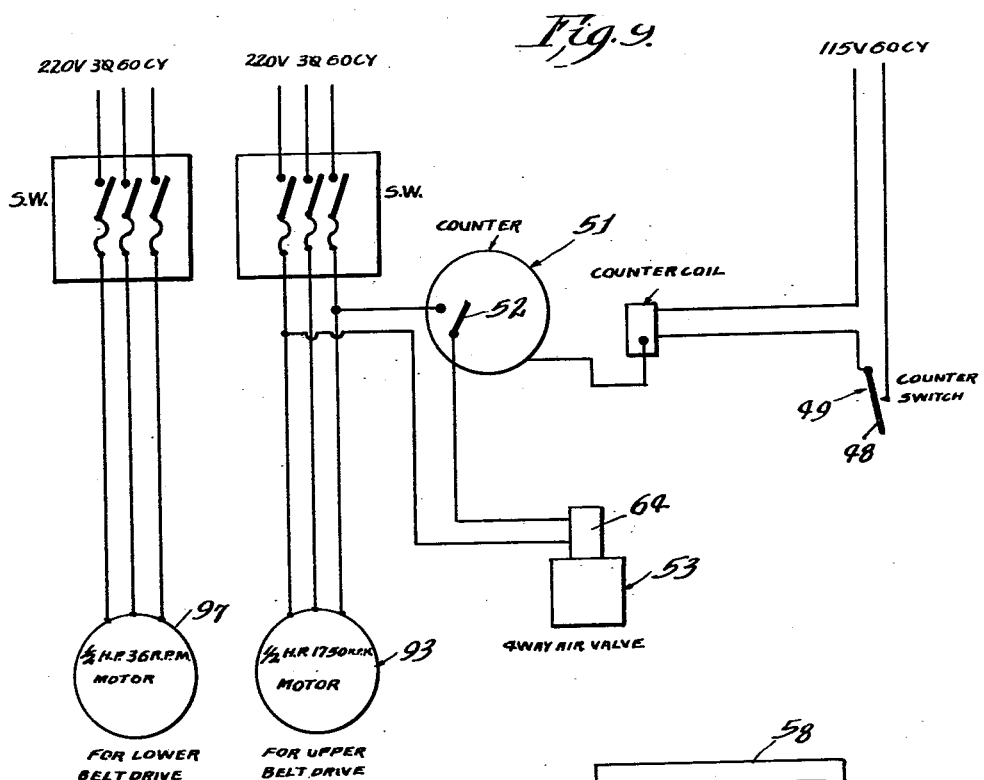
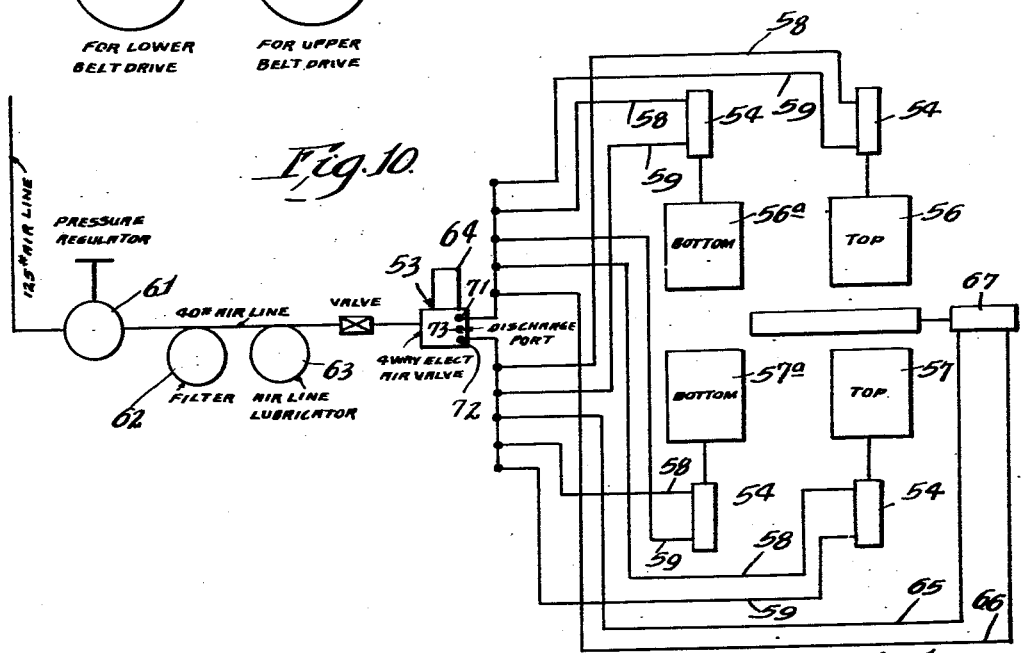

United States Patent Office 2,799,212
Patented July 16, 1957

2,799,212

FEEDING, COUNTING AND STACKING MECHANISM

William H. Taylor, Chicago, Ill.

Application August 12, 1953, Serial No. 373,725

12 Claims. (Cl. 93—93)

The present invention relates to a novel means and mechanism for automatically feeding, counting and stacking a predetermined number of articles capable of being collected and stacked and delivering these stacked articles to any continuous operation or manual loading.

Among the objects of the present invention is the provision of a novel mechanism for feeding, counting and stacking a predetermined number of articles such as books or magazines, although it is to be understood that the invention is not limited thereto but may be used to automatically feed, count, collect and stack any articles susceptible of such operations.

A further and important object of the present invention is the provision of a novel means and mechanism for collecting and stacking a predetermined number of articles in a hopper or box provided with two sets of slide members and each set comprising two slide members movable simultaneously in a horizontal plane but in opposite directions to their closed position and to their open, retracted position for discharge of the articles collected thereon.

Another object of the present invention is to provide a novel counting and stacking mechanism in which is embodied a novel hopper assembly for collecting and stacking the collected articles and provided with pneumatic actuating means for discharging these articles when a predetermined number have been collected in the hopper.

The present invention further comprehends the provision of a novel mechanism for receiving the articles to be stacked or grouped, and when a predetermined number have been collected they are automatically discharged and conveyed therefrom for a subsequent operation. In the disclosed and preferred embodiment, the counted articles are collected on one of a pair of horizontal slides with each slide comprising complementary sections and the sections of both slides moving in synchronism but in opposite directions whereby the sections of the upper slide are closed when the sections of the lower slide are opened, and the sections of the lower slide are closed when the sections of the upper slide are opened, whereby the operator is assured of collecting and stacking or grouping a predetermined number of articles in each stack prior to their discharge.

The novel invention further comprehends the provision of a novel slide or closure for a collecting hopper comprising two similar sections each affixed to a piston rod and actuated in opposite directions to open or close the discharge passage from the hopper by pneumatic pressure.

A further object of the present invention is the provision of a novel automatically operating means and mechanism for receiving books or magazines from a gathering machine, arranging and feeding these books or magazines in alignment along a conveyor system, counting, collecting and stacking a predetermined number of these books or magazines, and discharging the collected stack when the predetermined number has been reached.

Further objects and inherent advantages of the present invention will be readily appreciated by reference to the following description when considered in connection with the accompanying drawings.

In the drawings:

Figure 1 is a view in side elevation of the novel assembly including the means for supplying magazines, books or other articles from a gathering machine to the present novel assembly for delivering, counting and stacking of the gathered articles and discharging the stacks onto another conveyor for delivery to any continuous operation or manual loading, the gathering machine being broken away at its opposite ends.

Fig. 3 is an enlarged plan view of the novel stacking mechanisms as viewed in Fig. 2.

Fig. 4 is a view in vertical cross section taken longitudinally through the stacking mechanism in a plane represented by the line 4—4 of Fig. 3 and viewed in the direction of the arrows.

Fig. 5 is a view in vertical cross section taken transversely through the stacking mechanism in a plane represented by the line 5—5 of Fig. 3 and viewed in the direction of the arrows.

Fig. 6 is an enlarged view in vertical cross section taken transversely through the feeding or delivery mechanism, the view being taken in a plane represented by the line 6—6 of Fig. 1 and viewed in the direction of the arrows.

Fig. 7 is an enlarged view in vertical cross section of the conveyor belt and the means for feeding and frictionally retaining the books, magazines or other articles upon the conveyor belt and for delivery of these articles to the stacking mechanism, the view being taken in a plane represented by the line 7—7 of Fig. 8 and viewed in the direction of the arrows.

Fig. 8 is a fragmentary view of the novel frictional retaining means of Fig. 7, the view being taken from the left of Fig. 7 but with parts broken away and shown in vertical cross section.

Fig. 9 is a diagrammatic or schematic view of the wiring diagram for counting the articles supplied by the delivery means to the stacking mechanism and for actuating the air valve and the slide members of the stacking mechanism.

Fig. 10 is a diagrammatic or schematic view of the pneumatic system for actuating the pistons and piston rods to alternately move the upper and lower opposed slides into and out of position for receiving and supporting the magazines or books delivered thereto.

Figure 1:
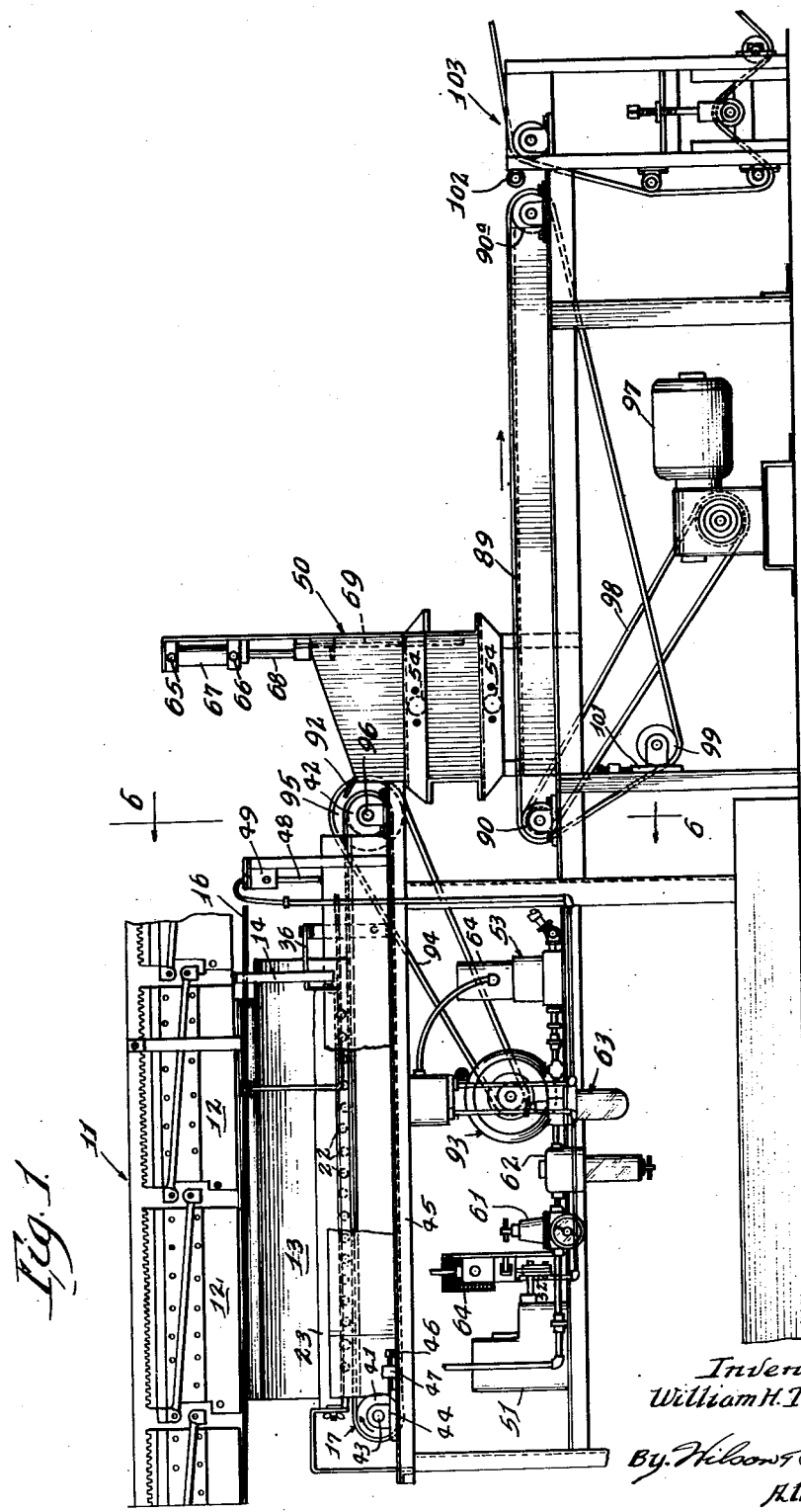

Referring to the disclosure in the drawings and more particularly to the novel illustrative embodiment therein shown, magazines, books or other articles capable of being counted and automatically stacked in a stack of a predetermined number and delivered in such stacked relation for subsequent packaging or for any other purpose, are delivered to the novel assembly and successively fed or conveyed in spaced but aligned relation, counted as they are being conveyed to and dropped into a hopper, in which a predetermined number of the articles are collected upon a pair of opposed retractable slides, and when the predetermined number are collected the stack of collected articles upon the slides is delivered to a conveyor or delivery belt for further handling.

Figure 2:
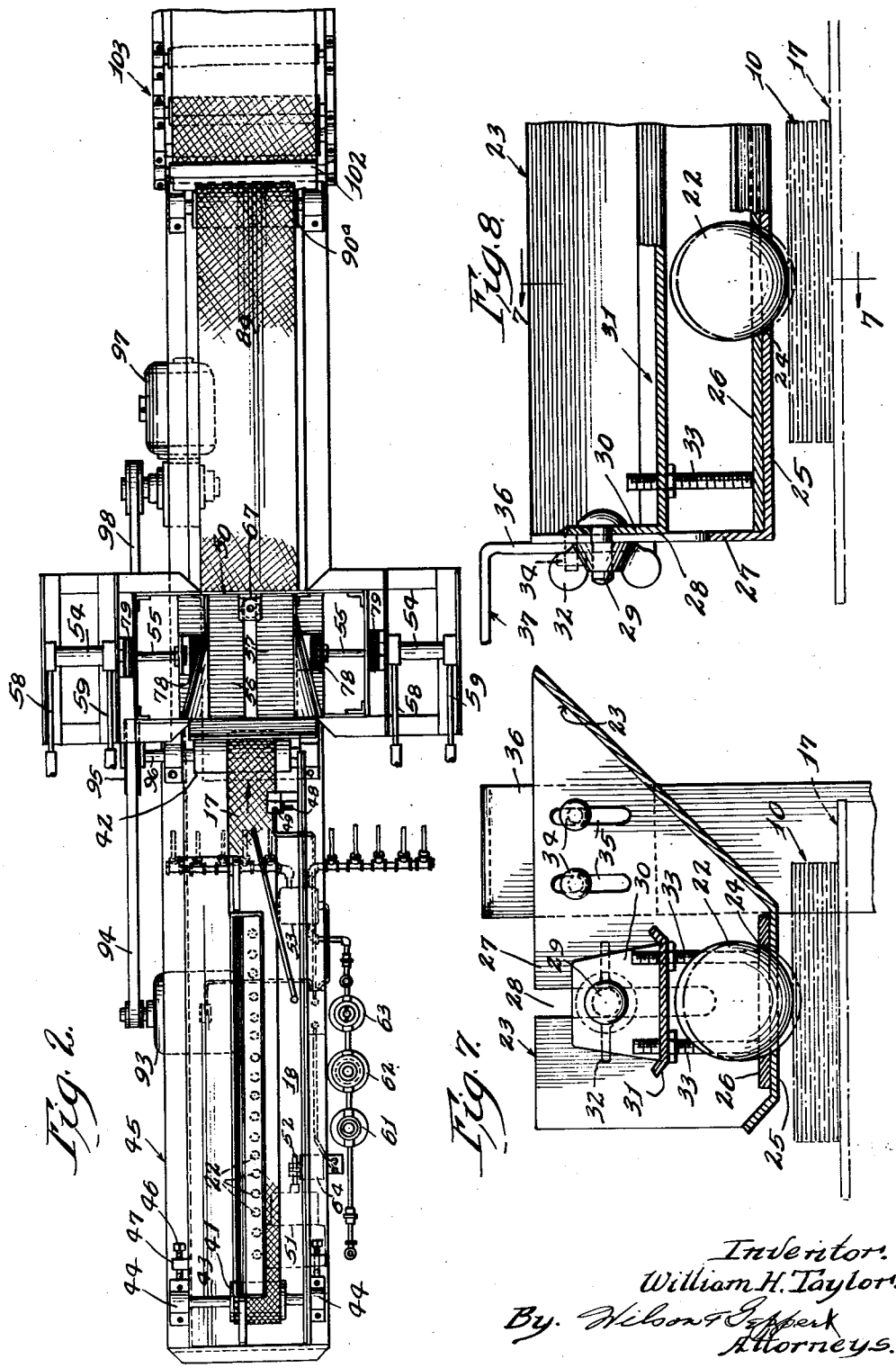
Fig. 2 is a top plan view of the assembly of Fig. 1, but omitting the portion of the gathering machine there shown.

In the present embodiment, reference will be made more particularly to the feeding, counting and stacking of magazines or books, although any articles which are susceptible of being fed, counted and stacked in multiple are comprehended by the present invention. The magazines or books 10 (Fig. 7) which may be composed of a cover and intermediate pages or sections gathered together and stitched generally along one edge, are delivered by the gatherer or gathering machine 11 and discharged therefrom adjacent its book clamps 12 onto a curved or inclined slide 13 affixed to the gatherer (Figs. 1, 2 and 6). Adjacent the slide 13 is a switch arm 14 connected to a master control 15 for controlling the operation of the gatherer whereby if the books or magazines jam up as they emerge from or are delivered by the gathering machine 11, this switch arm 14 is actuated and opens the contacts of the master control 15 to stop operation of the gathering machine.

The books or magazines 10 as they move downwardly over the elongated slide 13 (Fig. 6) and beneath the elongated shield 16 supported by and depending from the gathering machine, collect upon an endless conveyor belt 17 operating at a relatively high speed over a smooth upper plate or table 18. This conveyor belt is of substantially less width than the width of the books or magazines delivered thereto whereby an edge of these delivered books or magazines projects beyond the edge 19 of the conveyor belt and the opposite edge of the books or magazines is disposed alongside or adjacent the longitudinal edge 21 of the slide 13.

Each delivered book is positioned beneath one or more balls 22 (Figs. 6, 7 and 8) which may be of metal or other suitable material having substantial weight, and are loosely carried in an elongated and longitudinally extending supporting frame 23, the lower portion of each ball being supported in aligned, countersunk openings at 24 extending through the base 25 of the frame 23 and a plate 26 supported thereon. The opposite ends or end walls 27 of the frame 23 are each vertically notched at 28 for the reception of a bolt or set screw 29 secured to an upstanding arm or bracket 30 on each of the opposite ends of a longitudinally extending retaining plate 31 for vertical adjustment thereof. This retaining plate is spaced from and disposed above the plate 26 and base 25 of the frame 23 an amount sufficient to permit vertical movement of these balls, but preventing these balls from being dislodged by the books or magazines therebeneath. A wing nut 32 when tightened on its screw 29, locks the retaining plate 31 in its proper adjusted position.

Adjustable set screws 33 may also be provided to limit the position of the retaining plate 31 with respect to the plate 26 and base 25 of the frame 23. To rigidly but adjustably support the frame 23 and retain it in proper spaced relation with the belt 17, the oppoiste ends or end walls 27 of the frame 23 are each mounted by bolts and nuts 34 or other suitable securing means projecting through spaced vertically extending slots 35 to a depending flange 36 on an upstanding bracket 37 affixed to the frame of the machine. This permits the frame 23 to be quickly raised or lowered to the desired adjusted position.

The balls 22 create friction and cause the books or magazines to move with and be retained substantially flat upon the belt 17 and dragged by this belt travelling at a relatively high speed over the table 18 with the stitched or rear edge of these books or magazines moved to and along an upstanding wall at the front of the machine providing a stop or abutment 38. This wall or abutment like the table or horizontal surface 18 is of smooth metal, such as brass, and is affixed to and held rigid by a vertically arranged or upstanding supporting plate 39. To assure that the rear edge of the magazines or books is delivered to the wall or abutment 38, a pulley 41 for the rear end of the conveyor belt 17 is crowned and of substantially less width than the driven pulley 42 at the forward end of the belt, the latter pulley being preferably flat. To adjust the tension on the belt 17, the shaft 43 for the pulley 41 is rotatably mounted or journalled in pillow blocks 44 adjustably mounted on the frame 45 and adjusted by means of screws 46 adjustably mounted in a bracket 47 attached to the frame. The crown pulley 41 is of substantially the width of the belt and longitudinally adjustable on its shaft 43 whereby to adjust the distance or spacing between the wall, stop or abutment 38 and adjacent edge 19 of the conveyor belt 17. If desired, filler blocks of varying width may be disposed along the edge 21 of the slide 13 to vary the width of the space between it and the stop or abutment wall 38. By this construction and arrangement, books or magazines that vary through a relatively wide range may be accommodated and regardless of the angle at which the books or magazines 10 are delivered to the belt conveyor 17, they will be aligned longitudinally and carried along with the belt when dragged over the surface of the table 18 and along the adjacent stop or abutment 38.

As the books or magazines advance with the belt in aligned but spaced relation, each impacts or engages a depending arm 48 of an actuating switch 49 for counting the number being delivered to and collected in the box or hopper 50 in which are received and stacked a predetermined number of the books or magazines being received from the gatherer. This switch transmits an electrical impulse to an electrical counter 51 and moves the counter one notch. When a full count, as determined by the setting of the counter, has been reached, a contact switch 52 makes contact in the counter which energizes a 4-way air valve 53.

This air valve 53 automatically reverses the air pressure on the ends of the air cylinders 54, whereby the piston rod 55 of each cylinder is actuated in its proper direction and carries along therewith its slide member or section. There are two sets of these horizontally arranged and vertically spaced slides, the upper slide comprising two halves or complementary sections 56 and 57 and the lower slide comprisng two halves or complementary sections 56a and 57a. Thus by supplying air to one end of each cylinder through the pipe 58 or the pipe 59 and exhausting it through the other, each piston rod is moved in and out and carries therealong its respective slide section in predetermined sequence and synchronism.

The incoming air pressure which may be approximately 125 pounds per square inch, enters a pressure regulating valve 61 whereby the pressure is reduced to approximately 40 pounds per square inch (Figs. 1, 2, 8 and 9). The passage of this air continues through the air filter 62 and into and through an air line lubricator 63 which is preferably filled with oil and delivers oil into the air stream to continuously lubricate the interior of each air cylinder 54 for free movement of the piston therein. Air leaving the lubricator 63 enters the 4-way air valve 53 which is actuated by an electric coil or solenoid 64 for the purpose of reversing the ports therein to deliver air in the required direction through either the pipe 58 or the pipe 59 to one or the other end of each cylinder. As shown in Fig. 10, the 4-way air valve also supplies air through pipes or conduits 65 or 66 to the ends of a cylinder 67 having a piston rod 68 which carries a depending and vertically movable slide 69 at the forward end of the box or hopper 50 for retaining therein the accumulated or collected books or magazines until they are ready to be discharged by opening the lower slide sections 56a and 57a from the box or hopper.

As shown diagrammatically or schematically in Fig. 10, the 4-way air valve contains a port 71 for supplying air to one end of the cylinders 54 and 67 and a port 72 for supplying air to the other end of these cylinders, it being understood that when air is supplied through the port 71 to one end of these cylinders, air is being relieved through the port 72 from the other end of the cylinders. A port 73 in the air valve provides for discharge of the relieved pressure.

The upper slide sections 56 and 57 are moved into closed position whenever the lower slide sections 56a and 57a are opened to discharge an accumulated, stacked and counted number of the books or magazines, and the vertically operating retaining slide 69 is at such time elevated to permit such discharge of the stack whenever the lower slide sections 56ᵃ and 57ᵃ are opened. When the lower slide sections 56ᵃ and 57ᵃ are closed and the upper slide sections 56 and 57 are opened, the retaining slide 69 is lowered to provide an abutment across the forward or outer opening 74 of the box or hopper 50 (Figs. 4 and 5) to prevent discharge.

As shown in Figs. 3, 4 and 5, the upper slide sections 56 and 57 and the lower slide sections 56ᵃ and 57ᵃ are plates which when moved inwardly to an adjoining position as shown in Fig. 4, provide a supporting base for the magazines or books collected thereon. Each section has affixed thereto an angle bracket 75 provided with an upstanding flange 76 connected to one end of its piston rod 55 by nuts or other attaching means 77. A rubber bumper 78 is provided on each angle bracket 75 to absorb the shock of its piston rod 55 when the complementary slide sections are moved inwardly to retaining or closed position, and a rubber block 79 is provided to absorb the shock of each piston rod 55 when these slide sections are moved to open position. Each slide section moves in upper and lower guides 81 (Fig. 5).

The box or hopper 50 is provided with horizontally arranged frame members 82 and 82ᵃ upon which the air cylinders 54 are rigidly mounted, with vertically arranged side walls 83 and 83ᵃ each having openings 84 through which the piston rods 55 operate, and with intermediate side walls 85 and 85ᵃ which define the opposite sides of the hopper opening for receiving the collected books or magazines. The box is provided with end walls 86 and 87, the forward or outer end wall 87 being cut away at its lower end to form the opening 74 to permit the discharge and forward or lateral movement of the collected stacks when each stack is released upon opening the lower slide sections 56ᵃ and 57ᵃ and drops upon a travelling conveyor belt 89 driven about pulleys 90 and 90ᵃ, for delivery to any subsequent operation or manual loading. The intermediate side walls 85 and 85ᵃ are flared rearwardly at 91 (Fig. 3) and the end wall 86 is provided with an inclined flange or ledge 92 whereby the books or magazines delivered by the discharge end of the belt 17 are directed into the hopper.

Although the operation of the gathering machine 11 is controlled by the master control, the belt 17 is not controlled thereby but continues to operate to discharge any books or magazines thereon to the stacking mechanism or hopper. A motor 93 through a suitable drive means such as a belt 94 and sheave 95, rotates the shaft 96 carrying the driven pulley 42 at relatively high speed. A relatively low speed motor 97 is adapted to rotate the conveyor belt 89 by means of a belt 98 at a very substantial reduction in speed over that of the belt 17. An idler pulley 99 adjustably mounted on a support 101 and about which the conveyor belt 89 passes, permits adjustment of the tension on this belt. Books or magazines discharged in stacks of a predetermined number are deposited upon the conveyor belt 89 and from it onto an idler pulley 102 which discharges the stacks upon a further conveyor system 103 for delivering the stacks for wrapping or other subsequent operation.

The internal dimensions of the hopper or box 50 in which the conveyed articles are collected and stacked may be varied and is preferably provided with one or more filler blocks 104 for altering its internal dimensions to receive articles of varying sizes. These filler blocks 104 shown in Fig. 4, are preferably detachably anchored to an internal wall of the hopper receiving the articles by adjustable attaching screws 105 with the upper edge 106 of the block inclined to guide and direct the articles into the hopper.

Books or magazines discharged onto the conveyor belt 17 and moved thereby for discharge into the hopper or box 50, drop onto the lower slide members or sections 56ᵃ and 57ᵃ until a predetermined number for which the counter 57 has been set have been collected on these slide members. Then these slide members are retracted and the vertically movable retaining slide 69 is elevated whereby the discharge stack drops onto the conveyor belt 89 and is moved laterally on this belt through the opening 74 in the forward or end wall 87 of the box or hopper.

When the lower slide members or sections 56ᵃ and 57ᵃ are retracted to open position and the retaining slide 69 is raised, the upper slide members or sections 56 and 57 are moved to closed or retaining position to receive any books or magazines delivered while the lower slide members or sections are open. As soon as the stack is moved by the conveyor belt 89 beyond the opening 74 formed by the cutout in the end wall 87, these slide members or sections 56ᵃ and 57ᵃ close and the upper slide members or sections 56 and 57 open. Simultaneously, the retaining slide 69 is lowered. At such time, any magazines or books collected on the upper slide members or sections 56 and 57 drop onto the lower slide members or sections 56ᵃ and 57ᵃ and remain thereupon until the counted number have been stacked, when these lower slide members or sections open to discharge the stack and the sequence of operation above described continues.

The speed of rotation of the belts 17 and 89 may be readily adjusted relative to each other and relative to the speed of delivery from the gatherer 11 or other mechanism for supplying to the belt 17 the articles to be stacked. This is accomplished by substituting different diameter sheaves for driving these belts as the desired speed.

Having thus disclosed the invention, I claim:

1. In a feeding, counting and stacking mechanism, a hopper for receiving individual articles to be collected and stacked, means for delivering the articles to the hopper in substantial alignment, means for counting the articles delivered to the hopper, and means in said hopper for collecting, stacking and discharging said aligned stack containing a predetermined number of said articles when said number has been reached including members at the upper open end of the hopper for directing the articles received into an aligned stack in the hopper, said last mentioned means including two pairs of vertically spaced and longitudinally movable slide members with each pair adapted to be moved horizontally into closed or open position and with one pair moved to closed position when the other is moved to open position, and automatically-actuated means for alternately moving said pairs of slide members to closed and to open positions.

2. In a feeding, counting and stacking mechanism, a hopper for receiving individual articles to be collected and stacked, said hopper being open at the top and bottom and open at one end, two pairs of vertically spaced slide members in said hopper with each pair adapted to be moved horizontally into closed or open position and with one pair moved to closed position to receive the articles when the other pair is moved to open position, and a vertical slide adapted to move over the open end of the hopper and provide an abutment thereat to retain the articles on the lower pair of said slide members when the latter are closed, and automatically-actuated means for alternately moving said pairs of slide members into open and closed positions and for moving the vertical slide to lowered position over the open end of the hopper when the lower pair of slide members is moved to closed position, and moving the vertical slide to raised position to permit passage of the stack through the open end when the lower pair of slide members is moved to open position to discharge the stack.

3. Feeding, counting and stacking mechanism comprising conveying means for feeding articles delivered thereto, means for arranging the articles on said conveying means in substantial alignment, means for counting said articles, means for collecting and stacking a predetermined number of said articles including a hopper for receiving the articles, guide means adjacent the upper end of the hopper for receiving and guiding the articles fed thereto into vertical alignment within the hopper, and two pairs of vertically spaced and longitudinally movable slide members movable alternately into closed and open positions within the hopper with one pair movable into closed position to collect the stack when the other pair is moved to open position, and means for receiving the collected stack upon discharge from the lower pair of said slide members, said lower pair of slide members receiving the articles until the stack of a predetermined number of said articles is collected and when said lower pair of slide members is moved to open position for discharge of the collected stack, said upper pair of slide members is moved to closed position to collect the articles delivered to the collecting means until said lower pair of slide members is again moved to closed position whereupon the upper pair of slide members is moved to open position to drop the collected articles onto the lower pair of slide members, and means for alternately and synchronously moving the upper and lower pairs of slide members to closed and open positions.

4. In a feeding, counting and stacking mechanism, a hopper for receiving individual articles to be collected and stacked, said hopper being open at the top and bottom and open at one end, two pairs of vertically spaced slide members in said hopper with each pair adapted to be moved horizontally into closed or open position and with one pair moved to closed position to receive the articles when the other pair is moved to open position, and a vertical slide adapted to move over the open end of the hopper and provide an abutment thereat to retain the articles on the lower pair of said slide members when the latter are closed, automatically actuated means for alternately moving said pairs of slide members into open and closed position and for moving the vertical slide to lowered position over the open end of the hopper when the lower pair of slide members is moved to closed position, and moving the vertical slide to raised position to permit passage of the stack through the open end when the lower pair of slide members is moved to open position to discharge the stack, and conveying means for receiving the stack when discharged from the lower pair of slide members and moving the stack through the open end of the hopper.

5. Feeding, counting and stacking mechanism comprising means for feeding articles delivered thereto, means for arranging the articles on said feeding means in substantial alignment, means for counting said articles, means for collecting and stacking a predetermined number of said articles including a hopper having means for receiving and retaining the articles in a vertically aligned stack confined by the walls of the hopper and two pairs of vertically spaced slide members movable alternately into closed and open positions within the hopper with one pair movable into closed position to collect the stack when the other pair is moved to open position, and means for receiving the collected stack upon discharge from the lower pair of said slide members, said lower pair of slide members receiving the articles until the stack of a predetermined number of said articles is collected and when said lower pair of slide members is moved to open position for discharge of the collected stack, said upper pair of slide members is moved to closed position to collect the articles delivered to the collecting means until said lower pair of slide members is again moved to closed position whereupon the upper pair of slide members is moved to open position to drop the collected articles onto the lower pair of slide members, conveying means for receiving and removing the stack when discharged from the lower pair of slide members, and means for alternately and synchronously moving the upper and lower pairs of slide members to closed and open positions.

6. Feeding, counting and stacking mechanism comprising conveying means for delivering in sequence articles fed thereto, means for arranging the articles on said conveying means in substantial alignment, means for counting said articles as they are delivered by the conveying means, means for collecting and stacking a predetermined number of said articles including a hopper having means for receiving and guiding said articles into an aligned stack confined by the walls of the hopper and two pairs of vertically spaced slide members movable alternately into closed and open positions with one pair movable into closed position when the other pair is moved to open position, and pneumatically-actuated means for alternately moving said pairs of slide members to closed and open positions.

7. Feeding, counting and stacking mechanism comprising conveying means for feeding articles delivered thereto, means for arranging the articles on said conveying means in substantial alignment, means for counting said articles, means for collecting and stacking a predetermined number of said articles including a hopper having a front, rear and side walls spaced apart for conformably receiving and stacking therein the collected articles, means on said forward and side walls for directing said articles into said hopper, a pair of slide members movable in opposite directions and when moved into adjoining relation receiving thereon individual articles fed thereto until a stack of a predetermined number is received thereon and when moved to retracted position discharging the stack when said counting means reaches said predetermined number, a second pair of slide members disposed above said first mentioned pair and movable in opposite directions and when moved into adjoining relation temporarily receiving thereon individual articles fed to the hopper when the first pair of slide members is retracted, means for moving one pair of slide members into adjoining relation and simultaneously retracting the other pair of slide members, and means for receiving and removing the collected stack upon discharge.

8. Feeding, counting and stacking mechanism comprising conveying means for feeding articles delivered thereto, means for arranging the articles on said conveying means in substantial alignment, means for counting said articles, means for collecting and stacking a predetermined number of said articles including a hopper having means for directing the counted articles into the hopper and spaced walls for conformably receiving and aligning therein the collected articles to form a stack in which the articles are aligned in superposed relation, a pair of slide members movable inwardly in opposite directions through opposed walls to provide a closure for the lower end of the hopper receiving thereon individual articles fed to the hopper until a stack of a predetermined number is received thereon and movable outwardly in opposite directions to discharge the stack upon said counting means reaching said predetermined number, a second pair of slide members disposed above said first pair and movable inwardly in opposite directions through opposed walls to provide a temporary closure for the hopper receiving thereon the individual articles fed to the hopper when the first pair of slide members is moved outwardly for discharge of the stack, means for moving one pair of slide members inwardly to form a closure to collect the articles and simultaneously moving the other pair of slide members outwardly to discharge the articles collected thereon, and conveying means disposed beneath the hopper and in alignment with the feeding means for receiving and removing the collected stack when discharged.

9. Feeding, counting and stacking mechanism comprising conveying means for delivering articles fed thereto, means for arranging the articles on said conveying means in substantial alignment, means for counting said articles as they are being delivered, means for collecting individual articles from the conveying means and stacking a predetermined number of said articles including a hopper having encompassing walls with the interior of said walls spaced apart in substantial conformity with the size of the collected articles whereby to align and maintain the collected articles in superposed, aligned position, a pair of slide members movable in opposite directions through opposed walls of the hopper and when projected into closed position in the hopper provide a bottom for receiving said articles until a predetermined number has been stacked thereon and retracted into open, discharge position when the stack of said collected articles reaches a predetermined number as determined by said counting means, a second pair of slide members also movable in opposite directions through opposed walls of the hopper and projected into closed position to temporarily receive thereon individual articles fed to the hopper when the first pair of slide members is moved to open, discharge position, said second pair of slide members being moved to open position to drop the collected articles onto the first mentioned pair of slide members when the latter is returned to closed position after discharge of the stack of articles, automatically-operated means under control of said counting means for moving both pairs of slide members with one pair moved to open position when the other pair is simultaneously moved to closed position, one of said walls having an opening for passage of the discharged stack, and conveying means for receiving and removing the collected stack through said opening.

10. Feeding, counting and stacking mechanism comprising conveying means for delivering in sequence articles fed thereto, means for arranging the articles on said conveying means in substantial alignment, means for counting said articles as they are delivered by the conveying means, means for collecting and stacking a predetermined number of said articles including a hopper having encompassing walls providing an enclosure with the walls of said enclosure spaced apart in substantial conformity with the size of the collected articles, means for directing the collected articles into an aligned stack in the hopper with the articles in superposed relation and two pairs of vertically spaced slide members movable in opposite directions and alternately into closed and open positions in the hopper and either providing a closure to collect thereon articles fed to the hopper, one pair of said slide members being moved into closed position when the other pair is moved to open position, means under control of said counting means for simultaneously moving one pair of slide members to closed position while the other pair is moved to open position, and conveying means for receiving each collected stack upon discharge from the lower pair of said slide members, said hopper having a lateral passage for removal therethrough of each discharged stack collected on said last mentioned conveying means.

11. In a feeding, counting and stacking mechanism, a hopper for receiving individual articles to be collected and stacked, means for arranging the articles in substantial alignment prior to delivery to the hopper, means for adjusting the internal dimensions of said hopper to receive and collect therein said articles in a closely jogged stack, two pairs of vertically spaced slide members movable alternately and longitudinally into closed and open positions in said hopper with one pair movable into closed position in the hopper to receive thereon the articles collected in the hopper when the other pair is simultaneously moved to open position to drop the articles collected thereon, automatically-actuated means for alternately moving said pairs of slide members in opposite direction to closed and to open positions, counting mechanism for controlling the operation of said automatically-actuated means for the slide members in accordance with the number of articles collected in the hopper, and means for receiving the collected aligned stack upon discharge from the lower pair of said slide members.

12. Mechanism for receiving, counting and stacking articles as they are discharged from a delivery machine, comprising conveying means for receiving the articles and including a continuously operating conveyor belt movable in the same direction as the path of travel of the delivery machine, means for arranging the articles on said conveying means in substantial alignment, means engaged by said articles as they travel in spaced relation upon the belt for counting said articles, a hopper for receiving the counted articles having means for receiving and guiding said articles into an aligned stack confined by the walls of the hopper, two pairs of vertically spaced slide members in the hopper with the slide members of each pair movable in opposite directions, the lower pair when moved toward each other providing a closure for receiving and stacking the articles as they are fed thereto by the belt and the upper pair when moved toward each other providing a temporary closure, and pneumatically-operated means for actuating both pairs of said slide members to open the closure formed by the lower pair to discharge a stack containing a predetermined number of said articles from the hopper and simultaneously move the upper pair to form a temporary closure.

References Cited in the file of this patent

UNITED STATES PATENTS

| | | |
|---|---|---|
| 1,318,910 | Pfohl | Oct. 14, 1919 |
| 1,563,071 | Brecknell | Nov. 24, 1925 |
| 1,600,958 | Hart et al. | Sept. 21, 1926 |
| 1,987,352 | Tufts | Jan. 8, 1935 |
| 2,387,954 | Thompson | Oct. 30, 1945 |
| 2,414,059 | Powers | Jan. 7, 1947 |
| 2,606,483 | Forbes | Aug. 12, 1952 |